(12) United States Patent
Ennis et al.

(10) Patent No.: US 6,944,004 B2
(45) Date of Patent: Sep. 13, 2005

(54) ARRANGEMENTS TO DETECT AND RESPOND TO DISTURBANCES IN ELECTRICAL POWER SYSTEMS

(75) Inventors: Michael G. Ennis, Evanston, IL (US); Raymond P. O'Leary, Evanston, IL (US); Joseph W. Ruta, Arlington Heights, IL (US)

(73) Assignee: S&C Electric Co., Chicago, IL (US)

( * ) Notice: Subject to any disclaimer, the term of this patent is extended or adjusted under 35 U.S.C. 154(b) by 0 days.

(21) Appl. No.: 10/641,267

(22) Filed: Aug. 15, 2003

(65) Prior Publication Data

US 2004/0066201 A1 Apr. 8, 2004

Related U.S. Application Data

(60) Division of application No. 10/387,253, filed on Mar. 12, 2003, now Pat. No. 6,668,232, and a continuation of application No. 09/556,257, filed on Apr. 24, 2000, now Pat. No. 6,601,002.
(60) Provisional application No. 60/131,855, filed on Apr. 29, 1999.

(51) Int. Cl.[7] ................................................ H02H 3/00
(52) U.S. Cl. .......................... 361/94; 361/93.1; 361/62; 361/100
(58) Field of Search .......................... 361/93.1, 94, 62, 361/64, 66, 100, 113, 58, 85, 78, 18

(56) References Cited

U.S. PATENT DOCUMENTS 5,229,651 A * 7/1993 Baxter et al. ................. 307/66
5,790,391 A * 8/1998 Stich et al. .................. 363/24

* cited by examiner

Primary Examiner—Stephen W. Jackson
(74) Attorney, Agent, or Firm—James V. Lapacek (57) ABSTRACT

A control arrangement and method is provided for detecting and responding to disturbances in electrical power systems. In a preferred arrangement, an integration is initiated that is based on a comparison of actual voltage of a source and a reference voltage. When the integration exceeds a predetermined value, the source is considered unreliable. Also in a preferred arrangement, a determination is made as to whether or not the disturbance is a downstream fault condition. For example, this is useful for applications where a transfer is made from a first source to a second source when predetermined disturbances are detected. In this manner, the transfer of the load to a second source is avoided which would continue the supply of the downstream fault. Additionally, the arrangement distinguishes between various degrees of disturbances to permit appropriate response based on the severity and type of disturbance. For example, a first immediate response, i.e. without intentional delay, is provided for more severe disturbances while a second delayed response is provided for less severe disturbances. The control arrangements transfers the load to an alternate source of power via the use of a high-speed source-transfer switching system that both avoids undesirable current flow between sources and minimizes undesirable transfer delays.

5 Claims, 5 Drawing Sheets

ARRANGEMENTS TO DETECT AND RESPOND TO DISTURBANCES IN ELECTRICAL POWER SYSTEMS

This application is a divisional of 10/387,253 filed Mar. 12, 2003 now U.S. Pat. No. 6,668,232 and is a continuation of application Ser. No. 09/556,257 filed Apr. 24, 2000 now U.S. Pat. No. 6,601,002, in the names of Ennis et al. which claimed the benefit of U.S. Provisional Application No. 60/131,855 filed on Apr. 29, 1999.

BACKGROUND OF THE INVENTION

1. Field of the Invention

The present invention relates generally to methods and arrangements for detecting and responding to disturbances in electrical power systems and more particularly to methods and arrangements that detect various types of voltage disturbances while ignoring certain types of voltage disturbances and appropriately responding to the voltage disturbances.

2. Description of Related Art

Various types of voltage disturbances, such as sags, swells and transients, can occur on electrical power lines which are undesirable to continued proper operation of the various loads on the electrical system. Methods and arrangements have been proposed and/or used to detect and respond to these voltage disturbances including source-transfer systems which transfer the load to an alternate source, voltage regulators, so-called uninterruptable power supplies etc. In situations where the voltage disturbance is caused by a fault, it is undesirable to continue supplying the load where the fault is downstream of the source. However, where the fault is upstream and also in situations where the source sags for a prolonged period, it is desirable to transfer the load to an alternate source. Additionally, while various approaches are possible to reduce the magnitude and duration of transients, it is normally preferable to ignore these disturbances or respond to them in a manner different than other voltage disturbances. Arrangements to detect and respond to disturbances utilize various approaches including symmetrical components, DQ transforms, etc.

One arrangement to detect disturbances, shown in U.S. Pat. No. 4,002,950 to Dickerson, compares the actual voltage to a reference voltage and initiates action to interrupt supply to the load whenever the comparison exceeds a predetermined value.

While these arrangements may be useful and generally satisfactory for their intended purposes, they are not always capable of accurately and quickly detecting undesirable voltage disturbances which require action while accurately ignoring transients and the like. For example, the use of transforms results in relatively slow and desensitized responses, and are not very accurate in distinguishing between actual voltage sags/swells and transients, e.g. outrush current etc. Further, these arrangements are not capable of accurately predicting whether faults are upstream or downstream so that the continued supply of downstream faults is avoided.

SUMMARY OF THE INVENTION

Accordingly, it is a principal object of the present invention to provide arrangements and methods for accurately detecting and responding to disturbances in electrical power systems via integration based on a comparison of actual source voltage to a varying reference.

It is another object of the present invention to provide a method and arrangement to detect whether faults are downstream or upstream with respect to a particular location feeding a load from a source.

It is still another object of the present invention to provide a method and arrangement to detect voltage disturbances while discriminating against capacitor transients.

It is a further object of the present invention to provide an arrangement for detecting and responding to voltage disturbances by transferring a load to an alternate source of power via the use of a high-speed source-transfer switching system that both avoids undesirable current flow between sources and minimizes undesirable transfer delays.

It is yet another object of the present invention to provide arrangements and methods to detect and distinguish between various types and degrees of disturbances and to respond based on the severity of the disturbance, e.g. with or without intentional delay.

It is yet a further object of the present invention to provide a method and arrangement that compares rms voltage to a reference, sums the comparison over time and establishes a voltage disturbance based on the net sum exceeding a predetermined value.

These and other objects of the present invention are efficiently achieved by arrangements and methods for detecting and responding to disturbances in electrical power systems. In a preferred arrangement, an integration is initiated that is based on a comparison of actual voltage of a source and a reference voltage. When the integration exceeds a predetermined value, the source is considered unreliable. Also in a preferred arrangement, a determination is made as to whether or not the disturbance is a downstream fault condition. For example, this is useful for applications where a transfer is made from a first source to a second source when predetermined disturbances are detected. In this manner, the transfer of the load to a second source is avoided which would continue the supply of the downstream fault. Additionally, the arrangement distinguishes between various degrees of disturbances to permit appropriate response based on the severity and type of disturbance. For example, a first immediate response, i.e. without intentional delay, is provided for more severe disturbances while a second delayed response is provided for less severe disturbances. The control arrangements transfers the load to an alternate source of power via the use of a high-speed source-transfer switching system that both avoids undesirable current flow between sources and minimizes undesirable transfer delays.

BRIEF DESCRIPTION OF THE DRAWING

The invention, both as to its organization and method of operation, together with further objects and advantages thereof, will best be understood by reference to the specification taken in conjunction with the accompanying drawing in which.

DETAILED DESCRIPTION

Figure 1:
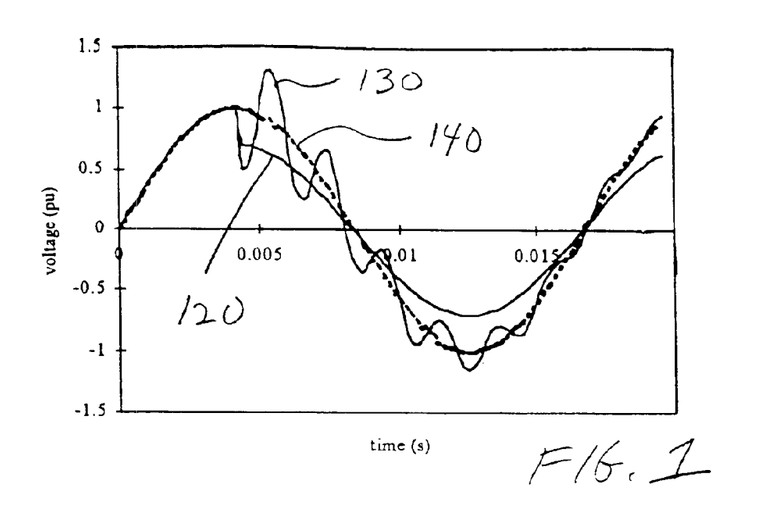
FIG. 1 is a diagrammatic representation of waveforms to illustrate various conditions to illustrate methods and arrangements of the present invention.

Referring now to FIG. 1, in accordance with important features of the present invention, a method and arrangement are provided for detecting and responding to voltage disturbances in an electrical power system having alternating current sources. For example, a waveform 120 of FIG. 1 represents the voltage waveform of a fault condition and a waveform 130 represents the voltage waveform where switching transients are present resulting from the switching of a capacitor bank. A waveform 140 represents the voltage waveform of a reference, i.e. an ideal waveform of an electrical power source where no voltage disturbances are present. The method and arrangement of the present invention detects the voltage disturbance represented by the fault waveform 120 while ignoring the transient response represented by the waveform 130.

Figure 2:
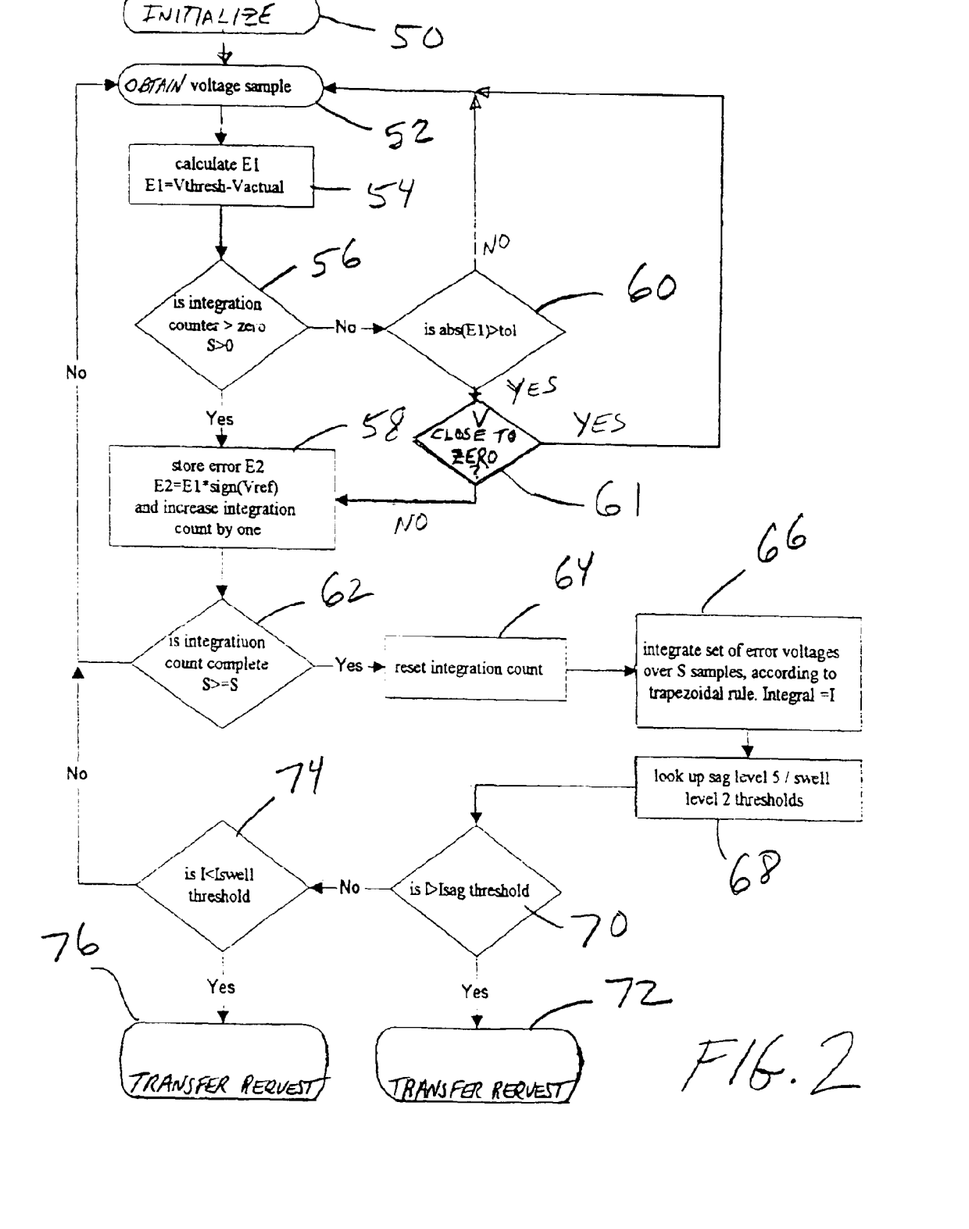
FIG. 2 is a flow diagram illustrating a specific implementation of the present invention to detect disturbances of a first type.

Specifically, and with reference now to FIG. 2, the method and arrangement of the present invention initiates an integration when the actual source voltage varies from the reference by a predetermined tolerance or threshold amount, e.g. 5% in a specific embodiment. In various illustrative embodiments, the reference is obtained either as a predetermined ideal waveform or a sample derived from one or more preceding cycles of the actual source waveform. The integration then takes place over a predetermined integration time, e.g. approximately ⅛ of a cycle in a predetermined embodiment. The integration in specific embodiments may be varied, e.g. increased, to better prevent response to switching transients.

If the resulting integration value at the end of the integration period exceeds a predetermined value, e.g. 0.6 millivolts.seconds in a specific embodiment, a predetermined disturbance condition is established. Depending on the type of disturbance condition that has been detected, e.g. a substantial sag condition, appropriate action is taken by associated circuit arrangements, e.g. perform a regulator function, discontinue the supply of power to the load, or transfer the load to an alternate source.

The flow diagram of FIG. 2 illustrates one basic implementation of the detection of voltage disturbances in accordance with the present invention. The flow process begins with initializing in a function block 50 and the obtaining of voltage sample data in a process block 52. The process flow continues to a process block 54 to compare the measured and reference waveforms, specifically, to calculate a parameter denoted "E1" obtained by subtracting the actual voltage sample from the reference voltage data. The process flow then continues to a determination block 56 to determine if the integration process is already in process, i.e. specifically if the integration counter is greater than zero. If the integration process is already in process, i.e. integration counter greater than zero, the process flow proceeds to a process block 58 to increase the integration counter by one count and to calculate and store a parameter denoted "E2" which is obtained by multiplying E1 by the sign of the voltage of the reference waveform. Multiplication by the sign of the reference waveform is necessary to provide appropriate integration where the waveforms include transition through zero voltage and preserves the convention of the sense of the parameters being greater than or less than the reference waveform, i.e. a swell will always be negative and a sag will always be positive. If it is determined in the determination block 56 that the integration counter is not greater than zero, i.e. the integration process is not currently in process, the process flow proceeds to a determination block 60 to determine if the difference parameter E1 between the actual and reference waveforms is greater than a tolerance or threshold, e.g. 5 percent in the specific example.

If the difference E1 does not exceed the specified value, the process flow returns to the process block 52. If the difference E1 exceeds the specified value, the process flow proceeds to a determination block 61 to determine if the present point on the waveform is in an appropriate range to begin an integration process. For example, in a specific embodiment, if the point is within approximately ±0.5 milliseconds of a voltage zero, this is an inappropriate point to begin integration. This is done to prevent false initiation of the integration process that might prevent response to legitimate faults. If the point-on-wave is not within the undesired range, the determination in the determination block 61 is no and the process flow proceeds to the process block 58 as already discussed. If the determination in the determination block 61 is yes, i.e. that the point-on-wave is in the undesired range, the process flow returns to the process block 52.

From the process block 58, the process flow of FIG. 2 then proceeds to a determination block 62 to determine if the integration process of the specified number of samples in a specified time interval is complete, i.e. is integration count complete? If the integration count is not complete, the process flow returns to the process block 52 to continue the integration process until the specified number of integrations has been completed. If the integration count is complete, e.g. in a specific example 25 integration samples have been completed, the process flow proceeds to a process block 64 to reset the integration count, then to a process block 66 to integrate the set of error voltages, e.g. according to a trapezoidal rule in a specific example.

For example, the following equation is utilized in one particular illustrative implementation to provide the integral denoted "I" as follows:

$$I = \left( \frac{V_0 + V_N}{2} + \sum_{i=1}^{N-1} V_i \right) \cdot \Delta t$$

where $V_0$ is the first sample and $V_N$ is the last sample in the integration set, and $\Delta t$ is the sample interval. At this point, the results of the integration process are evaluated and compared to various specified values to determine what various disturbances have been detected. For example, in the specific example of the process flow of FIG. 2, the process flow proceeds to a process block 68 to look up a sag level 5 and a swell level 2 threshold. In a preferred embodiment, the threshold for sag level 5 is varied based on the point on wave where the disturbance is detected.

The process flow then proceeds to a determination block 70 where the integral I is compared to the threshold level. If this sag level 5 threshold is exceeded, a transfer request is made at 72. If the sag threshold is not exceeded, the process flow proceeds to a determination block 74 to determine if the integral I is less than a swell level 2 threshold (negative number), corresponding to a substantial swell disturbance. If the swell threshold is established, a transfer request is made at 76. If the swell threshold is not met, the process flow returns to the process block 52 to continue the process to detect voltage disturbances. For a multi-phase system, the flow diagram of FIG. 2 is implemented for each phase for which detection is desired such that a voltage disturbance may be detected and a decision to transfer requested for each of the phases on an independent basis. Thus, in accordance with the practice of the method of FIG. 2, the detection of a voltage disturbance and the request for transfer is completed within approximately 2 milliseconds or ⅛ of a cycle for a 60 hz system.

While the method and arrangement illustrated by the flow diagram of FIG. 2 may be utilized to detect various voltage disturbances, it is especially useful to detect those disturbances that are judged to be quite substantial such that so-called instantaneous detection and response is desirable, instantaneous in this context being most accurately defined as without the introduction of any intentional delay. Considering other less substantial or severe voltage disturbances, the detection and response process is not required to be so rapid especially since it is typical to wait various predetermined or user adjustable delay times before responding and taking action after such less severe disturbances are detected. For example the following is an illustrative example of how various disturbances may be categorized according to their severity or substantiality of departure from the nominal supply waveform along with illustrative selected response times, which as discussed may be varied and user selected along with the levels of the % values from nominal for the various categories:

| Category | % from nominal | % of nominal | response in cycles |
|---|---|---|---|
| sag level 1 | −5% | 95% | 10 |
| sag level 2 | −10% | 90% | 7 |
| sag level 3 | −15% | 85% | 4 |
| sag level 4 | −20% | 80% | 1 |
| sag level 5 | −30% | 70% | instantaneous |
| swell level 1 | +10% | 110% | 7 |
| swell level 2 | +20% | 120% | instantaneous |

Figure 3:
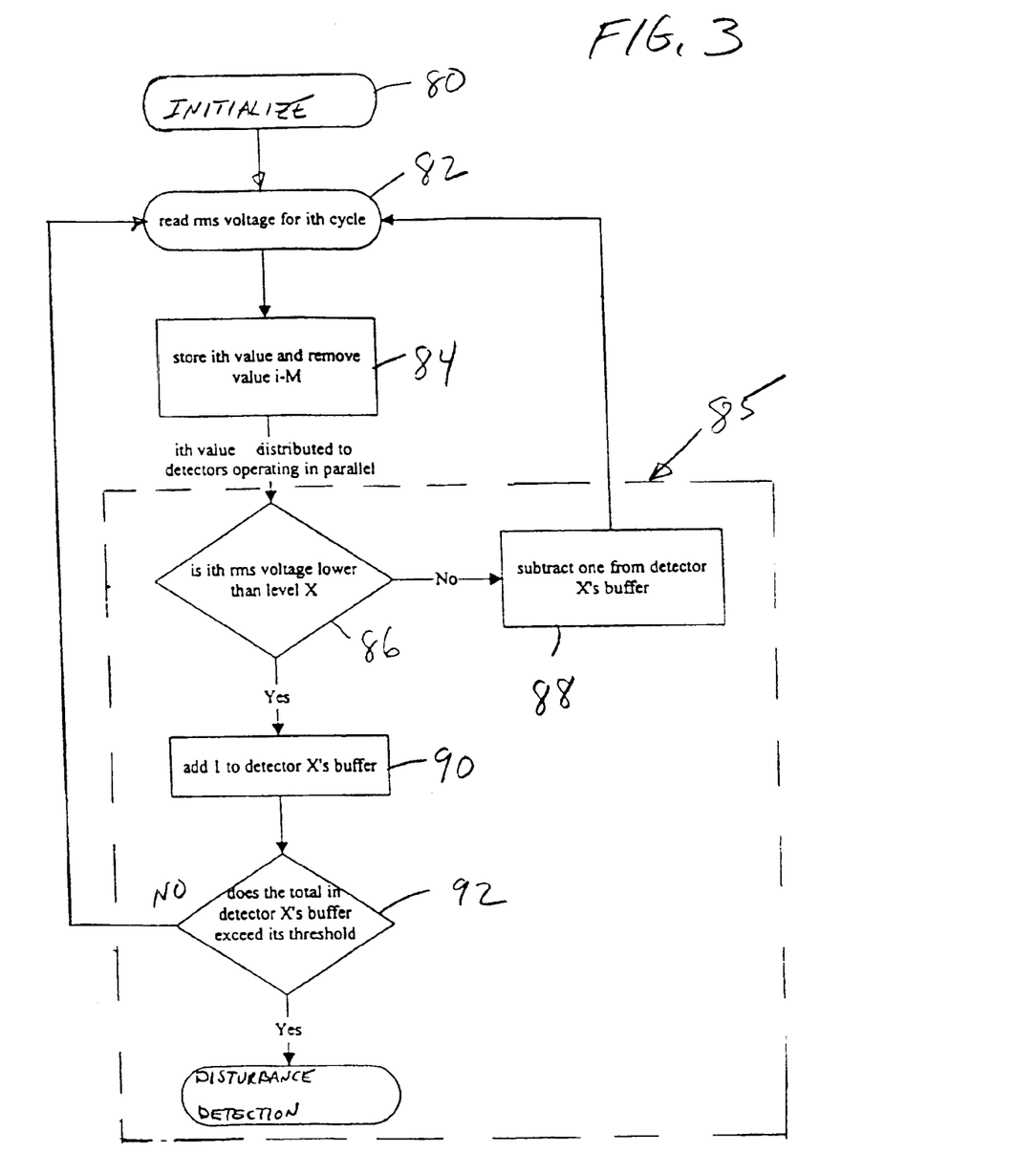
FIG. 3 is a flow diagram illustrating a specific implementation to detect disturbances of a second type.

In accordance with important aspects of the present invention and with additional reference now to FIG. 3, while the disturbance detection method described hereinbefore that utilizes integration is desirable for the category disturbances of sag level 5 and swell level 2, various of the remaining categories are detected utilizing a method and arrangement based on changes in the rms voltage or "rms-type" time-averaged voltage characteristics rather than the volts seconds product of the difference between the actual and reference voltages. Considering an illustrative example of this method and arrangement depicted in the flow diagram of FIG. 3, the process flow begins with initializing in a block 80 and the obtaining of rms voltage sample data in a process block 82. In various implementations, this data is derived from a portion of one or more current or previous cycles of the source waveform. The process flow continues to a process block 84 where the data values are updated and stored and then to a detector section generally referred to at 85. In a preferred embodiment, the detector 85 is representative of a plurality of such detectors, one for each of the disturbance categories to be detected in addition to the instantaneous categories, e.g. 5 in the categorization above (sag levels 1–4 and swell level 1).

The detector section 85 includes a determination block 86 which determines if the sample rms voltage is lower (greater for swells) than a predetermined level denoted "X" that is as specified for each of the disturbance categories of interest in accordance with the foregoing table. Functionally, the determination is whether or not the sample data compared to the predetermined level X exceeds the deviation of the level X from nominal. If the rms voltage sample does not exceed the deviation, i.e. is not lower (greater for swells), the process flow proceeds to a process block 88 in which the detector buffer is decremented (but not less than zero), e.g. a subtraction of one count, and the process flow returns to the process block 82. If the rms sample voltage is below the specified level (above for swells), the process flow proceeds to a process block 90 wherein the detector buffer is incremented by adding one. The process flow then proceeds to a determination block 92 to determine if the total in the detector buffer exceeds the specified predetermined value which may also be characterized as a threshold level. If the threshold is exceeded, the process flow proceeds to establish a disturbance detection requiring a transfer, e.g. as input/output data to associated process and control apparatus. If the threshold is not exceeded in the determination block 92, the process flow returns to the process block 82. Accordingly, the method of FIG. 3 provides a net summing or time averaging of the comparison over time between the actual voltage samples and the predetermined levels representing various sag/swell deviations from nominal. For swell level determinations, the sample and the level X may be considered as negative numbers such that a swell greater than the level X is considered lower or exceeding the level X in the determination block 86.

In a multi-phase system, the process of FIG. 3 is implemented for each phase for which independent detection is desired, i.e. such that a disturbance detection process is simultaneously provided for each of the phases. It should also be understood that in various embodiments, the process of the flow diagram of FIG. 3 may be implemented for one or more of various disturbance categories with selected predetermined detection levels and response times related to the predetermined values or thresholds. It should also be realized that the response time in cycles and the specified threshold levels (also characterized as predetermined values) are related but may be different based on the frequency of the sample data and process cycle of the detector 85, e.g. less than, equal to, or greater than once per cycle of the source waveform, etc.

Considering other important aspects of the present invention, a method and arrangement are provided to determine whether or not a detected fault condition is upstream or downstream of the observation or detection point in the power system, i.e. with respect to the source connection supplying the downstream load. When conditions are detected corresponding to faults, e.g. a sag level 5, while it is, of course, desirable to discontinue the supply of a load from a source that has an upstream fault, it would be undesirable to transfer the supply of the load to another source where the fault is downstream of the source connections.

Figure 4:
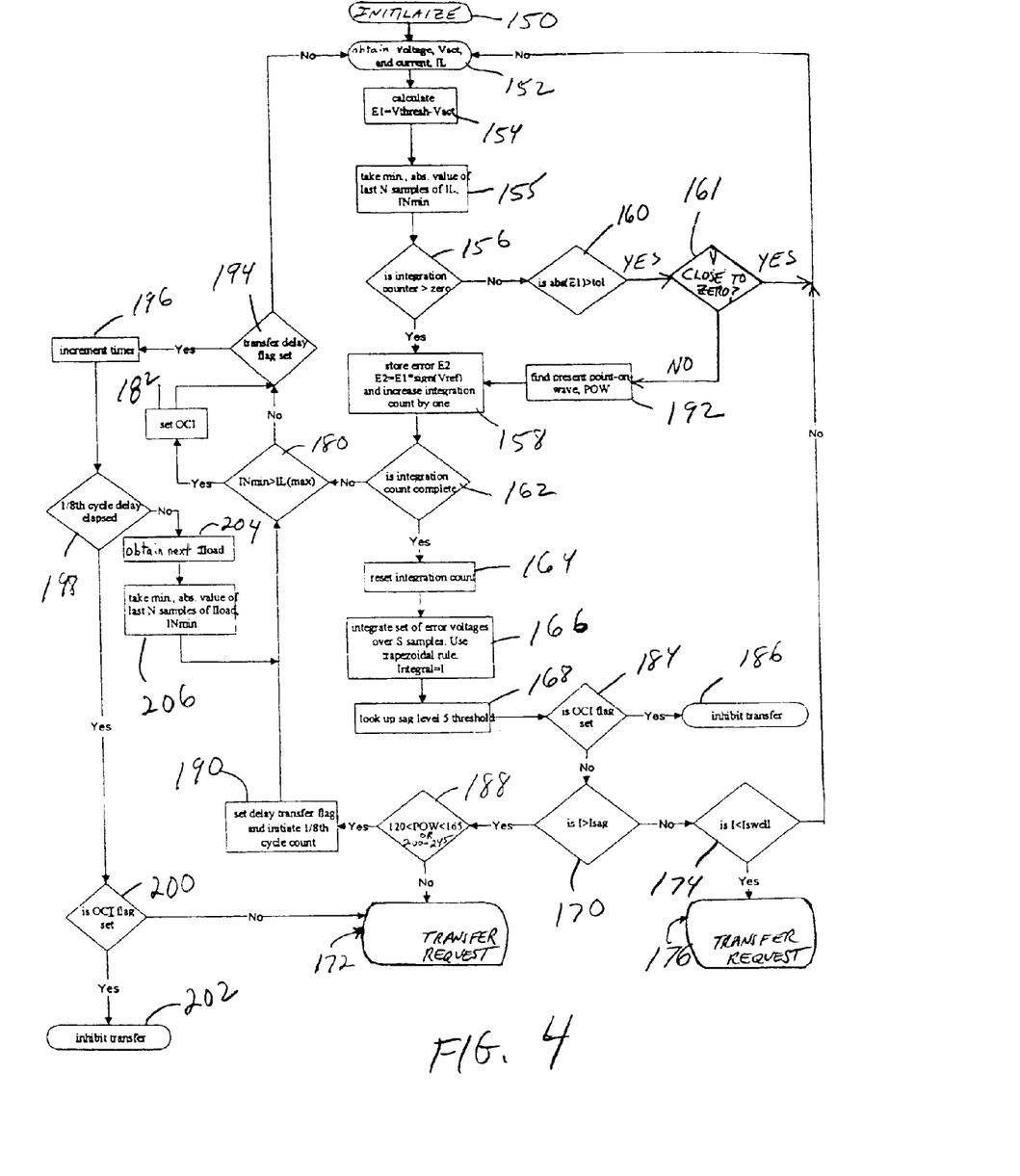
FIG. 4 is a flow diagram illustrating a specific implementation to determine downstream faults in the context of the flow diagram of FIG. 2.

With additional reference now to FIG. 4, an illustrative flow diagram depicts an illustrative specific embodiment to determine downstream faults in the context of the disturbance detection method and arrangement of FIG. 2 for the instantaneous response categories. In the illustrative example characterized as an overcurrent inhibit or OCI process, the process flow begins with initializing in a block 150 and the obtaining of voltage and current sample data in a process block 152, the data samples being denoted Vact and Iload. The process flow then proceeds generally along the lines as in the flow diagram of FIG. 2 utilizing flow blocks 154, 156, 158, 160, 161, 162, 164, 166, 168, 170, 172, 174 and 176 functioning as the corresponding flow blocks 54, 56, 58, 60, 61, 64, 66, 68, 70, 72, 74 and 76 respectively.

In the process flow of FIG. 4 between the flow blocks 154 and 156, a process block 155 is provided to establish a current threshold current parameter INmin, obtained as the minimum of n samples of the current Iload. The threshold is thus obtained to avoid contribution by spurious measurements. A determination block 180 utilizes the parameter INmin to determine if the sampled current exceeds a threshold indicating a downstream fault, i.e. a current which is larger than load outrush conditions and upstream faults. This determination is made when it has been determined in the determination block 162 that the integration count is not complete, i.e. during each loop of the integration process. If it is determined in the block 180 that the current sample indicates a downstream fault, an overcurrent inhibit state or flag is set in block 182, denoted "OCI", the consequences of which will be explained in more detail hereinafter.

In the process flow between the blocks 168 and 170, a determination block 184 is provided to determine if the OCI flag is set at 182. If the OCI flag is set, the process flow proceeds to an inhibit transfer termination block 186 as an output indicating that any transfer response (i.e. transferring the load from the existing source to another source) should be inhibited due to the presence of a downstream fault. Considering additional aspects of the OCI process, between the flow blocks 170 and 176, a determination block 188 is provided to determine if the point on the waveform, denoted "POW", is between 120–165 degrees or 200–245 degrees. If it is determined that the waveform is being sampled in that range during the integration process, the program flow proceeds to a process block 190 to set a delay transfer flag and initiate a ⅛ of a cycle count to provide a delay function before the process flow proceeds to the determination block 180 to determine if the current threshold establishes a downstream fault. The delay provided via the process block 190 is necessary for this range of points on the waveform since a fault occurring at minor sub loops at the end of each half cycle can interfere with the obtaining of accurate current data samples, the delay allowing time for the current to build to levels for proper detection. The "POW" parameter is obtained in a process block 192 located in the process flow between the flow blocks 160 and 158.

Considering additional features of the OCI method and arrangement, when the determination in the block 180 establishes that the sampled current does not indicate a downstream fault condition, the process flow proceeds to a determination block 194 to determine if a transfer delay flag has been set, in block 190. If no transfer flag has been set, the process flow returns to the process block 152. If the transfer flag has been set, the process flow proceeds to a process block 196 that increments a timer and then to a determination block 198 to determine whether or not the ⅛ of a cycle delay has elapsed. If the delay has elapsed, the process flow proceeds to a determination block 200 to determine if the OCI flag is set. If the OCI flag is not set, the process flow proceeds to the transfer request block 172. If the OCI flag is set, the process flow proceeds to an inhibit transfer termination block 202 to provide output data indicative that transfer to another source should be inhibited due to the detection of a downstream fault. The OCI flag, once set, is not reset until the fault condition ceases.

Accordingly, the process of FIG. 4 is useful to determine whether a fault condition is upstream or downstream and is especially useful along with the method of FIG. 2. to detect disturbances but to inhibit transfer when a disturbance is detected but transfer is undesirable due to the likely presence of a downstream fault condition. For example, the process depicted in the flow diagram of FIG. 4 implements a control arrangement in accordance with the present invention to determine fault location as part of the implementation of the voltage disturbance arrangement of FIG. 2.

In accordance with other aspects of the present invention, other methods to detect downstream faults before transfer may also be utilized with the disturbance detection method and arrangement of FIG. 2 for the instantaneous response categories. For example, three additional methods are described herein, although it is thought that the aforementioned OCI method of FIG. 4 is generally more accurate and reliable.

For example, in accordance with a first additional method to determine downstream faults before transfer, the interrelation of supply voltage and fault current may be utilized. That is, the direction of the fault current and normal system voltage can be accurately compared to determine whether the fault is upstream or downstream. When a fault occurs downstream of a measurement device, current must flow in a positive direction with respect to the normal system voltage. For a sinusoidal voltage and fault switching angles in the range $0-\pi$ radians (positive half cycle), the fault current will, initially move in an increasingly positive direction, and for switching angles in the range $\pi$ to $2\pi$ radians (negative half cycle), the fault current will tend towards an increasingly negative value initially. When the fault is upstream of the measurement device, the opposite is the case. Therefore, this can be utilized as a method of determining the direction of a fault. The reference voltage signal described hereinbefore can be used to accurately compare the fault current and the normal system voltage. For relatively minor upstream faults, there may be no significant change in the current. Consequently, a second check is required to verify whether the current is representative of a fault or of a load. Fault currents will achieve high absolute values with high rates of change. Since this combination is unlikely to occur for a normal system current, it is possible to set a combination of threshold di/dt and an absolute current value that are above levels presented by normal load currents. To successfully detect relatively low faults, a method can be utilized involving the combination of a threshold di/dt being exceeded and an absolute current magnitude being satisfied. While this approach is generally accurate in many situations, for portions of the source waveform which may contain minor sub-loops of current, i.e. those that occur close to the end of a half cycle of the voltage waveform, this directional detection method requires changes in the threshold values for detection. Thus, the detection method changes the threshold values in the vicinity of a voltage zero. This entails choosing detection of either phase to ground or phase to phase faults due to the differences between these fault types. The method must also accommodate the fact that minor sub-loops associated with phase-to-phase faults and phase-to-ground faults occur at different points in the half cycle.

A second additional approach extends the method of the first additional approach via the interrelation of supply voltage and fault current via utilizing three phase-to-ground and three phase-to-phase voltage and current detectors that determine the direction and relative magnitude of the currents. The decision on whether or not a downstream fault exists is then based on a polling of the various detections. While this approach is believed to be generally accurate for the various downstream load connection arrangements, e.g.

a secondary fault on a delta-wye transformer, there are a large number of variables and detectors and the majority decision is determined by a plurality of only one detector out of six as shown by the examples below, where "U" denotes upstream, "D" denotes downstream, and "X" denotes no determination:

EXAMPLE 1

C-Phase Fault to Ground

| | Secondary side fault | | | | | | | Primary side fault | | | | | | |
|---|---|---|---|---|---|---|---|---|---|---|---|---|---|---|
| t (ms) | A | AB | B | BC | C | CA | poll | A | AB | B | BC | C | CA | poll |
| 6 | D | D | X | U | U | D | D | X | X | X | D | U | D | D |
| 8 | D | D | X | D | D | D | D | X | X | X | U | D | D | D |
| 10 | D | D | X | D | D | D | D | X | X | X | D | D | D | D |
| 12 | D | U | X | D | D | D | D | X | X | X | D | D | D | D |
| 14 | D | D | X | U | U | D | D | X | X | X | D | D | X | D |

EXAMPLE 2

Fault Between Phases B and C Only

| | Secondary side fault | | | | | | | Primary side fault | | | | | | |
|---|---|---|---|---|---|---|---|---|---|---|---|---|---|---|
| t (ms) | A | AB | B | BC | C | CA | poll | A | AB | B | BC | C | CA | poll |
| 6 | U | X | D | D | D | U | D | D | X | D | D | D | U | D |
| 8 | D | X | U | U | D | D | D | D | X | U | U | D | D | D |
| 10 | D | X | D | D | D | D | D | D | X | D | D | D | D | D |
| 12 | D | X | D | D | D | D | D | D | X | D | D | D | D | D |
| 14 | U | X | D | D | D | U | D | D | X | D | D | D | U | D |

A third additional approach is based on the conservation of the total system energy when a fault occurs. When a downstream fault occurs, the voltage sags toward zero and a large current flows. However, the total magnetic flux in the system remains virtually constant during a fault. If the fault is upstream, the point of reference is outside the conserved flux system and the energy will not appear to have been conserved. On the other hand, if the fault is downstream, there should be no observed change in the overall magnetic flux of the system. Further, this method provides implicit directionality since large flux deficits can only be accrued by upstream faults, regardless of whether the fault is phase to phase or phase to ground. The missing flux to detect an upstream fault is obtained by integrating the following difference equation with respect to time:

$$\Delta V = Vref - (V + L \, di/dt).$$

The inductance L of the system is relatively accurately determined and typically in a relatively narrow range. The missing flux can be measured against a reference flux that accommodates variations of the point on wave.

While the three additional approaches discussed hereinabove to detect downstream faults before transfer are relatively simple and generally useful, it is thought that the aforementioned OCI method of FIG. 4 is generally more accurate and reliable, and thus preferred.

Figure 5:
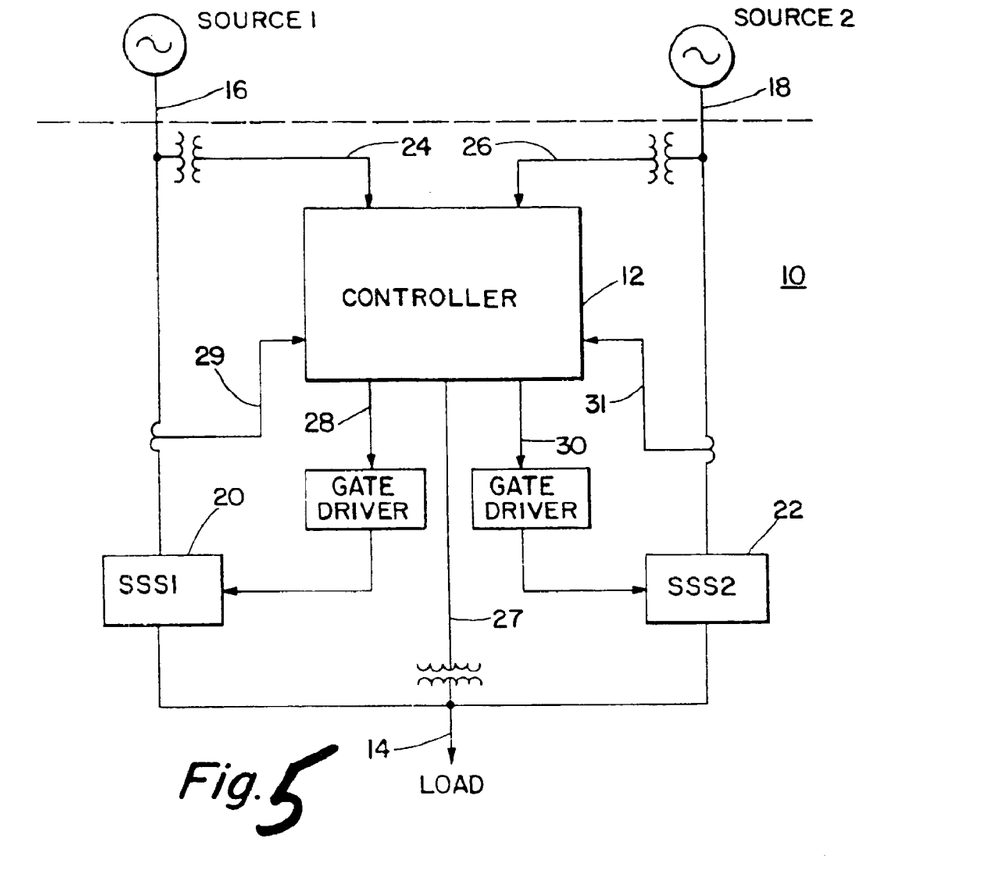
FIG. 5 is a one-line, block diagram representation of a system utilizing the methods and arrangements of the present invention.
Figure 6:
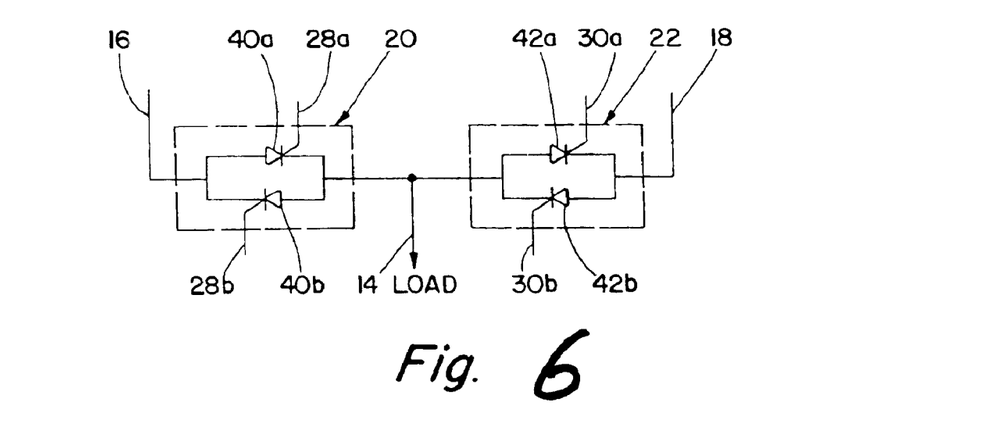
FIG. 6 is a one-line, diagrammatic representation of portions of a solid-state switch of FIG. 5.

In accordance with important aspects of the present invention, one particular application of the methods and arrangements to detect various disturbances is to respond to disturbances in an appropriate manner, e.g. by transferring the supply of a load from a first source on which a voltage disturbance is detected to a second source. Specifically and with additional reference now to FIG. 5, the flow diagrams of FIGS. 2, 3 and/or 4 are utilized to control the illustrative source transfer switching system 10, which may be characterized as a power-electronic switching system, high-speed source-transfer switching system or HSSTSS. The high-speed source-transfer switching system (HSSTSS) 10 includes a controller stage 12 that includes the process implemented by the various flow diagrams of FIGS. 2–4. The HSSTSS 10 supplies a load at 14 with an alternating-current waveform via either a first AC source at 16 or a second AC source at 18. The first and second AC sources 16 and 18 and the load at 14, as provided in an electrical power distribution system, are typically multi-phase circuits which are represented in FIG. 5 by a one-line diagram.

Figure 7:
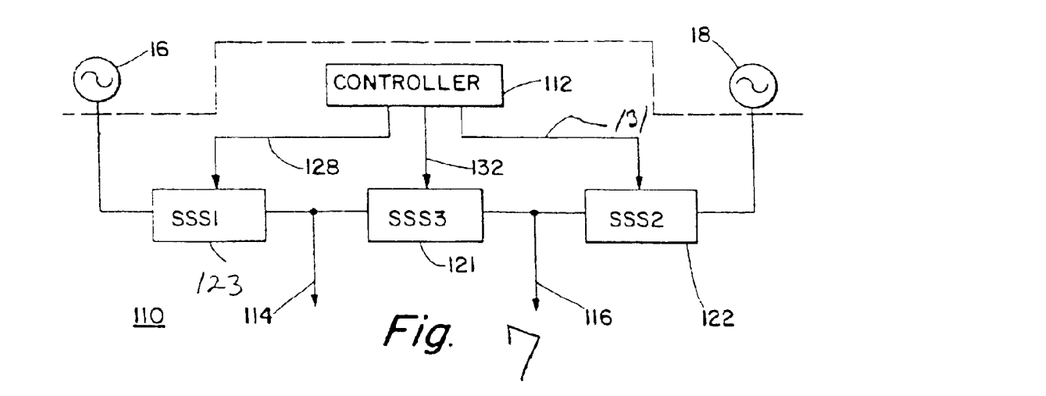
FIG. 7 is a one-line, block diagram representation of another system with a circuit configuration different than that of FIG. 5.

The HSSTSS 10 includes a first solid-state switch, SSS1, 20 and a second solid-state switch, SSS2, 22, the solid-state switches 20 and 22 also being referred to as power electronic switches. The HSSTSS 10 via the controller stage 12 controls either SSS1 to supply the load at 14 via the first source 16 or controls SSS2 to supply the load at 14 via the second source 18. The samples of the voltage waveforms of each source 16, 18 are provided via respective sensing inputs at 24, 26. The controller stage 12 under the control of the various flow diagrams of FIGS. 2–4 provides appropriate control signals at 28, 30 to control the operation of each respective solid-state switch, SSS1 20 and SSS2 22. For example, assume that SSS1 20 is turned on by the controller stage 12 via signals at 28 so as to be conductive and supply the 131, and 132. The specific illustrative circuit configuration of FIG. 7 implements a split-bus primary selective system, which is used to split the load during normal operation. Specifically, in normal operation, a first source 16 supplies a first load circuit 114 via SSS1 and a second source 18 supplies a second load circuit 116 via SSS2, with SSS3 normally being turned off (nonconducting) and functioning as a bus-tie switch. Thus, each of the sources 16, 18 is a preferred source for its respective load circuit 114, 116 and each is an alternate source for the other load circuit, 116, 114 respectively. When one of the sources at 16, 18 is lost or exhibits undesirable characteristics, the controller 112, after a transfer decision is made, and as described hereinbefore, removes the signals at 128 or 131 and applies signals at 132 such that the load circuits 114, 116 are supplied from one of the sources at 16 or 18. For example, if the source 16 is lost, SSS1, 123 will be turned off and SSS3, 121, the bus-tie switch, will be turned on to supply the load circuit 114 while SSS2, 122 continues to supply the load circuit 116. The polarity comparison to establish the appropriate application of control signals in the circuit configuration of FIG. 7 utilizes the differential voltage across the incoming switch, e.g. SSS3, 121 when transferring the load circuit 114 so as to be supplied from the source 18 via SSS3, 121 and SSS2, 122. Similarly, upon the return of the source 16, when the normal configuration is to be restored, the differential voltage across the incoming switch, e.g. SSS1, 123 is utilized for the polarity comparison.

When disturbances are detected via the methods of FIGS. 2 3 and/or 4, before any transfer decision is made by the controllers 12 or 112 to discontinue the supply of a load from a first source and to supply that load from a second source, it is first determined whether or not the transfer will be to a source of better quality than the source currently supplying the load. The best source/load configuration is determined based on the measured values and expected load conditions, i.e. the source that is anticipated to serve the load(s) with voltages within the nominal range or of closest proximity thereto.

While there have been illustrated and described various embodiments of the present invention, it will be apparent that various changes and modifications will occur to those skilled in the art. Accordingly, it is intended in the appended claims to cover all such changes and modifications that fall within the true spirit and scope of the present invention.

What is claimed is:

1. A method for detecting voltage disturbances in an alternating-current power system comprising the steps of:
    determining the rms voltage of the alternating current;
    comparing the determined rms voltage with one or more predetermined reference levels;
    summing the results of said comparing step over time by repetition of said determining and comparing steps; and
    establishing a voltage disturbance based on a net sum of said summing step exceeding one or more predetermined values.

2. The method of claim 1 further comprising detecting a plurality of different categories of voltage disturbances corresponding to a plurality of the predetermined reference levels and summing the results of said comparing step for each of the different categories, a predetermined value being established for each of the plurality of different categories of voltage disturbances.

3. The method of claim 2 wherein the one or more predetermined reference levels represent deviations from a nominal source voltage, said summing step further comprises incrementing the net sum each time the comparison exceeds the deviation of the one or more predetermined reference levels from the nominal source voltage and decrementing the net sum (if positive) each time the comparison does not exceed the deviation of the one or more predetermined reference levels from the nominal source voltage.

4. A method for detecting voltage disturbances in an alternating-current power system comprising:
    comparing the determined rms voltage with one or more predetermined reference levels:
    summing the results of said comparison over time; and
    establishing a voltage disturbance based on a net sum of said summing step exceeding one or more predetermined values, wherein one or more other categories of disturbances are established by establishing different levels for each of the one or more predetermined reference levels corresponding to each of the one or more other categories of disturbances.

5. The method of claim 4 wherein the one or more predetermined reference levels represent deviations from a predetermined reference voltage.

* * * * *